United States Patent [19]

Burba, III

[11] Patent Number: 4,472,362

[45] Date of Patent: Sep. 18, 1984

[54] REGENERATION OF CRYSTALLINE LITHIUM ALUMINATES

[75] Inventor: John L. Burba, III, Angleton, Tex.

[73] Assignee: The Dow Chemical Company, Midland, Mich.

[21] Appl. No.: 412,677

[22] Filed: Aug. 30, 1982

Related U.S. Application Data

[63] Continuation-in-part of Ser. No. 217,614, Dec. 18, 1980, Pat. No. 4,348,295.

[51] Int. Cl.$^3$ .............................................. C01D 15/00
[52] U.S. Cl. .............................. 423/179.5; 260/448 R; 423/366; 423/395; 423/473; 423/476; 423/499; 423/629
[58] Field of Search .................... 423/179.5, 366, 395, 423/473, 476, 499, 629; 260/448 R

[56] References Cited

U.S. PATENT DOCUMENTS

| | | | |
|---|---|---|---|
| 4,159,311 | 6/1979 | Lee et al. | 423/179.5 |
| 4,221,767 | 9/1980 | Lee et al. | 423/179.5 |
| 4,376,100 | 3/1983 | Lee et al. | 423/179.5 |

*Primary Examiner*—John Doll
*Assistant Examiner*—Wayne A. Langel
*Attorney, Agent, or Firm*—W. J. Lee

[57] ABSTRACT

Crystalline 2-layer lithium aluminate, especially when carried in an ion exchange resin, is regenerated for use as an extractor for Li$^+$ values in aqueous solution, said regeneration being done by using an aqueous wash containing at least about 800 ppm Li$^+$ ion.

10 Claims, No Drawings

REGENERATION OF CRYSTALLINE LITHIUM ALUMINATES

CROSS-REFERENCE TO RELATED APPLICATIONS

This is a continuation-in-part application of copending application Ser. No. 217,614, filed Dec. 18, 1980, now U.S. Pat. No. 4,348,295 which teaches preparations of 2-layer and 3-layer lithium aluminates, with and without substrates such as ion exchange resins.

Another copending application, Ser. No. 217,611 filed Dec. 18, 1980, now U.S. Pat. No. 4,348,296 also discloses preparation of 2-layer and 3-layer lithium aluminates on various substrates.

BACKGROUND OF THE INVENTION

U.S. Pat. No. 4,116,858 and U.S. Pat. No. 4,159,311, disclose that an ion exchange resin may be saturated with aqueous $AlCl_3$ solution and that reaction with $NH_4OH$ converts the $AlCl_3$ in situ to $Al(OH)_3$. This so-formed amorphous $Al(OH)_3$ is then reacted with LiX, where X is halide, at elevated temperature to form crystalline $LiX \cdot 2Al(OH)_3$ which is useful in selectively recovering $Li^+$ values from aqueous solutions, e.g., Li-containing brines.

U.S. Pat. No. 4,116,856 and U.S. Pat. No. 4,221,767 disclose that improvements in the above discussed formation of crystalline $LiX \cdot 2Al(OH)_3$ are found by reacting amorphous $Al(OH)_3$, or crystalline hydrous alumina (e.g., norstrandite, bayerite, gibbsite or mixtures of these) with LiOH to form $LiOH \cdot 2Al(OH)_3 \cdot nH_2O$ which is then reacted with LiX to form the crystalline $LiX \cdot 2Al(OH)_3$, where X is halide.

Various forms of alumina, $Al_2O_3$, are known, some of which occur as natural minerals, some of which are hydrated, and some of which are crystalline. The Handbook of Chemistry shows the following:

| Name | Crystalline Form | M.P. °C. |
| --- | --- | --- |
| aluminum oxide, $Al_2O_3$ | hex. col. | 2050 |
| $\alpha$-$Al_2O_3$, corundum | trig; col. cr, n | 2015 |
| $\gamma$-$Al_2O_3$, $\gamma$-alumina | wh. micro. cr., n | tr.to alpha |
| $Al_2O_3 \cdot 3H_2O$, gibbsite, (hydrargillite) | monocl., wh.cr. | tr.to $Al_2O_3 \cdot H_2O$ (Boehmite) |
| $Al_2O_3 \cdot 3H_2O$, bayerite | wh. micro. cr. | tr.to $Al_2O_3 \cdot H_2O$ (Boehmite) |
| aluminum oxide, $Al_2O_3 \cdot xH_2O$ | amor. wh. pwd. | -$xH_2O$,tr. to $\gamma$-$Al_2O_3$ |

Norstrandite is a crystalline hydrous alumina, as are gibbsite and bayerite.

The present disclosure is believed to be most closely related to the above-identified patents and the patents are incorporated by reference in their entirety here. The teachings in U.S. Pat. No. 4,116,856 are particularly relevant where it discloses that crystalline hydrous alumina (e.g., norstrandite and/or bayerite) dispersed in ion exchange resin is not converted back to its original $LiX \cdot 2Al(OH)_3 \cdot nH_2O$ form by treatment with LiX unless the hydrous alumina is first, or simultaneously, reacted with LiOH. I have found, however, that crystalline hydrous aluminas can be reacted directly with lithium salts to form crystalline lithium salt aluminates if the correct ranges of temperature and concentration are employed. I have also found that 2-layer lithium aluminate can be regenerated, without conversion to gibbsite, by employing an aqueous wash containing at least about 800 ppm. $Li^+$.

SUMMARY OF THE INVENTION

Crystalline lithium aluminates of the 2-layer variety are regenerated by using an aqueous wash containing at least about 800 ppm $Li^+$ ion. The regenerated crystals, being appreciably deficient (i.e., "unloaded") with respect to $Li^+$ values are particularly suitable for extracting $Li^+$ values from Li-containing brines, such as Smackover brine or brine leachings of Spodumene ore.

DESCRIPTION OF THE INVENTION

Crystalline hydrous aluminas are reacted with lithium salts under the influence of elevated temperature and sufficient concentration to form lithium aluminates, designated here as $LiX \cdot 2Al(OH)_3 \cdot nH_2O$ where X is an anion characterized as an anion which will form acids when in molecular combination with hydrogen or will form salts when in molecular combination with metal ions. It will be understood, of course, that the lithium aluminates will normally contain some waters of hydration, designated as $nH_2O$ in the above formula. The anion may have a valence of 1, 2, or 3.

When the beginning hydrous alumina is amorphous, such as when freshly prepared by ammonia precipitation of $Al(OH)_3$ from an $AlCl_3$ solution, the reaction to form lithium aluminates may be done using relatively weak solutions of the lithium salt (up to about 10%) and at relatively low temperatures (e.g., 20° C.–40° C.), then when heated at, e.g., about 50° C. or higher, the lithium aluminate becomes crystallized as a 3-layer crystal.

However, when the beginning hydrous alumina is crystalline (such as bayerite, gibbsite, norstrandite, or boehmite), then the relatively low temperature treatment with lithium salt does not appear to form an appreciable amount (if any) of lithium aluminate within a reasonable length of time.

It has now been found, surprisingly, that when heated at elevated temperature of preferably about 85° C.–120° C., the mixture of crystalline hydrous alumina and lithium salt forms lithium aluminate. Along with this higher temperature, it is necessary that the lithium salt solution be of a relatively high concentration, preferably above about 12%, most preferably above about 20% or may be at the saturation limit of the lithium salt, especially if it is only slightly soluble. The combination of high temperature and high concentration is particularly effective in forcing the lithium salt into the layers of the hydrous alumina crystals, which in some cases gives a crystallographic unit cell having two layers of lithium salt and two layers of hydrous alumina and in other cases gives a crystallographic unit cell having three layers of lithium salt and three layers of hydrous alumina.

As used herein, the expressions "2-layer" and "3-layer" refer to the number of layers bounded on both sides by the aluminate layers into which the subject Li compounds are intercalated. It will be realized, of course, that the crystals of lithium aluminates are normally present as aggregates or stacks of a plurality of unit cells rather than each unit cell standing as a separate physical entity.

The lithium aluminates discussed here have two crystal structures, viz those of 2-layer crystallographic unit cells and those of 3-layer crystallographic unit cells. The 3-layer lithium aluminates have a 3-fold screw axis oriented parallel to the c-axis of the lithium aluminate crystal. The 2-layer lithium aluminates have a 2-fold axis of rotation oriented parallel to the c-axis, as determined by the x-ray crystal studies.

For purposes of discussion and description in this disclosure, 2-layer lithium aluminates and 3-layer lithium aluminates are graphically illustrated as follows:

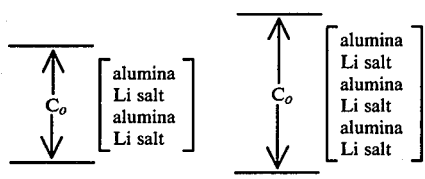

The heating of the mixture of lithium salt and hydrous alumina crystals may be performed in an open vessel, in a closed vessel, or at reflux. If performed in an open vessel where water vapor can escape, or if reduced pressure is applied to remove water vapor, the resulting increase in concentration of the lithium salt is beneficial in that the higher concentration tends to help drive the lithium salt into the alumina layers.

In those instances wherein water vapor is allowed to escape, a low concentration (generally less than about 10%) lithium salt may be employed at the outset, then the increase in concentration which results from water loss can be sufficient to drive the lithium salt into the hydrous alumina.

The preferred lower ratio of lithium salt to hydrous alumina, $Al(OH)_3$, in the mixture is about 0.5 moles of Li to 1 mole of Al. The upper limit of Li to Al is the saturation point of the lithium salt solution.

The lithium salts for reaction with the hydrous alumina can be at least one of the group exemplified by LiCl, LiBr, LiI, $LiNO_3$, $LiClO_4$, LiClO, LiSCN, LiOOCH, $LiC_2H_3O_2$, and the like. Stated another way the X in LiX may be any anion of a halo acid (excluding F), a mineral acid or inorganic acid, or an organic acid which is stable under reaction conditions. Virtually any water soluble lithium salt would be expected to be within the purview of this invention so long as the anion is not so large as to preclude entering the interstices of the alumina crystal.

The 2-layer variety of lithium aluminate is a novel composition and is prepared by reaction of lithium salt with gibbsite. Reaction of lithium salt with other forms of hydrous alumina, such as bayerite or norstrandite, produces 3-layer lithium aluminates. It is not possible to convert 2-layer lithium aluminate to 3-layer lithium aluminate without completely solubilizing the lithium aluminate to re-precipitate it as 3-layer.

The 2-layer $LiCl.2Al(OH)_3.nH_2O$ crystal, whether in neat form or supported on or within a substrate, exhibits different behavior in $H_2O$ than does the 3-layer variety. When reacted with $H_2O$ the 2-layer $LiCl.2Al(OH)_3.nH_2O$ decomposes to LiCl and gibbsite with the equilibrium LiCl concentration of about 0.14 moles of $Li^+$ per liter of solution, whereas the 3-layer $LiCl.2Al(OH)_3.nH_2O$ crystal is stable in $H_2O$ if there is as much as about 50 ppm $Li^+$ in the solution.

The 2-layer $LiX.2Al(OH)_3.nH_2O$ can be reacted with LiOH to form 2-layer $LiOH.b\ 2Al(OH)_3.nH_2O$; this can then be neutralized with an acid to form 2-layer lithium aluminate containing anions of the acid. Likewise 3-layer $LiOH.2Al(OH)_3.nH_2O$ can be neutralized with an acid to form 3-layer lithium aluminate containing anions of the acid.

The porous substrate into which the crystalline hydrous alumina can be loaded may be an inert material, such as an inorganic or organic material. For certain uses and reasons, the substrate is preferably a macroporous resin such as an ion exchange resin as taught in U.S. Pat. No. 4,116,858 and U.S. Pat. No. 4,116,856.

The present invention encompasses the regeneration of 2-layer crystalline $LiX.2Al(OH)_3.nH_2O$, where X is halide, preferably chloride, when said 2-layer crystals are contained within an ion exchange resin, thereby forming a composite useful for removing $Li^+$ ions from solution. It has been found that an aqueous leaching used in regenerating the crystal will destroy the 2-layer crystal structure unless the leaching solution contains at least about 800 ppm $Li^+$ ion, preferably at least about 1000 ppm; the temperature of the leaching solution is preferably in the range of about 70° C. to about 100° C. If the $Li^+$ ions are the result of dissolving LiCl in water, then a $Li^+$ ion concentration of about 800 ppm is equivalent to about 4888 ppm of LiCl; a $Li^+$ ion concentration of about 1000 ppm is equivalent to about 6110 ppm of LiCl.

If a leaching solution is used which contains substantially less than about 800 ppm $Li^+$ ion concentration, then the 2-layer crystal structure may revert to gibbsite. Then when it is rejuvenated with LiCl it reforms 2-layer crystals, or if a base, such as LiOH, is present it reforms as 3-layer or a mixture of 2-layer and 3-layer depending on the amount of base and LiCl.

The examples which follow are to illustrate particular embodiments; the invention is not limited to the particular embodiments illustrated, but is limited only by the claims.

EXAMPLE 1

A 50-gram portion of gibbsite is reacted with 200 ml of 20% LiCl solution at 115° C. for about 2 hours. The product obtained is 2-layer $LiCl.2Al(OH)_3.nH_2O$ as determined by x-ray diffraction data.

EXAMPLE 2

A 200-ml portion of a macroporous ion exchange resin in bead form (DOWEX MWA-1, a Trademark of The Dow Chemical Company) containing gibbsite within its pores is reacted with about 500 ml of 20% LiCl solution at about 105° C. under reflux for about 2-3 hours. The reaction product obtained is 2-layer $LiCl.2Al(OH)_3.nH_2O$ as determined by x-ray diffraction data.

EXAMPLE 3

A 200-ml portion of the same resin as in Example 2 above, but containing bayerite within its pores, is reacted with about 500 ml of 20% LiCl solution at about 105° C. under reflux for about 2-3 hours. The reaction product obtained is 3-layer $LiCl.2Al(OH)_3.nH_2O$ as determined by x-ray diffraction data.

EXAMPLE 4

About 200 ml of the same resin as above, but containing norstrandite within its pores, is refluxed with about 500 ml of 20% LiCl solution for about 2-3 hours. The reaction product obtained is 3-layer $LiCl.2Al(OH)_3.nH_2O$ as determined by x-ray diffraction data.

EXAMPLE 5

About 10 grams of 2-layer $LiCl.2Al(OH)_3.nH_2O$ is repeatedly washed with 1% LiOH solution at room temperature until no Cl⁻ is detected in the filtrate by AgNO$_3$ test. Analysis data from x-ray diffraction shows the material is 2-layer LiOH.2Al(OH)$_3$.nH$_2$O.

The 2-layer LiOH.2Al(OH)$_3$.nH$_2$O is titrated with CH$_2$CHCO$_2$H, acrylic acid, to a pH of 5. X-ray diffraction data shows 2-layer Li(CH$_2$CHCO$_2$).2Al(OH)$_3$.nH$_2$O.

EXAMPLE 6

A composite of 2-layer lithium aluminate/resin is prepared by reacting gibbsite-containing DOWEX MWA-1 ion exchange resin with a 20% aqueous solution of LiCl. The composite is prepared for use as a Li+ value absorber by substantially "unloading" (i.e., regenerating) Li+ values from the crystal by washing it with a 1000 ppm Li+ solution at 90° C. The so-regenerated composite is useful for extracting Li+ values from a Li+-containing natural brine (Smackover brine) until the 2-layer crystal is again loaded with Li+ values. Regeneration with 1000 ppm Li+ solution at 90° C. creates no gibbsite, indicating the 2-layer crystal remains intact. In contrast thereto, regenerating with water containing no Li+ values, or containing only about 300 ppm Li+ values causes degeneration of the 2-layer crystal to gibbsite in the resin.

Compounds made in accordance with the present disclosure are useful in selectively removing Li+ values from aqueous solution and are also useful in exchanging of the anion (X) with other anions in aqueous solution. Of special interest is the removal of Li+ values from natural brines, e.g., Smackover brine, and from ore leachings, e.g., Spodumene ore.

EXAMPLE 7 (Arkansas Smackover brine)

Crystalline 2-layer LiCl.2Al(OH)$_3$.nH$_2$O is prepared within macroporous beads of DOWEX-MWA-1-Cl ion exchange resin by reacting gibbsite-containing resin with a 20% aqueous solution of LiCl, thereby forming a composite having about 3.04 millimoles of Al per ml. of resin.

About 120 ml. of the composite is placed in an exchange column and is washed with about 150 ml. of 93° C. Li+ solution (1000 ppm Li+) to remove (unload) some, but not all, of the Li+ values from the composite; no degradation of the 2-layer crystal to gibbsite is found.

Arkansas Smackover brine, containing about 250 ppm of Li+ is passed through the composite at a temperature of about 95° C. and a flow rate of 10 ml./min. until equilibrium is reached, indicating the aluminate crystal is loaded with Li+.

The composite is regenerated (unloaded) by passing 150 ml. 1000 ppm Li+ solution (95° C.) at a flow rate of about 3 ml./min., catching the effluent in 5 ml. cuts. The LiCl concentration of the cuts peaks at 3.93% LiCl; ¼ bed volume of product cuts yields 3.02% LiCl.

A loading curve is obtained for the composite by pumping Arkansas Smackover brine through it at a flow rate of 10 ml./min. and a temperature of 90° C. The composite is fully loaded after about 1300 ml. of the brine have passed through.

EXAMPLE 8 (Spodumene ore)

About 200 gm of spodumene, LiAlSi$_2$O$_6$, is roasted in an oven at 900° C. for 24 hours; this converts the spodumene from the alpha crystalline form to the more desirable beta crystalline form. About 800 ml. of 26% NaCl solution (90° C.), at a flow rate of about 5 ml./min., is passed through the ore to wash Li+ values therefrom; the effluent salt solution contains about 400 ppm Li+.

About 120 ml. of a composite of crystalline 2-layer LiCl.2Al(OH)$_3$.nH$_2$O contained in an ion exchange resin (as in Example 6 above) is regenerated (unloaded) by use of a 1000 ppm Li+ solution wash (temperature about 95° C.). Then the Li-containing brine (70° C.–95° C.) from the ore leaching is passed through the composite to remove Li+ from the brine, thus re-loading the 2-layer aluminate crystal in the composite. Regeneration (unloading) of the composite using a 1000 ppm Li+ solution wash (70° C.–95° C.) yields a ¼ bed volume LiCl product of about 2.7% LiCl.

If the spodumene ore is not heated hot enough, or long enough to convert it from alpha crystalline form to beta crystalline form, the process is inefficient because NaCl solutions do not otherwise effectively remove LiCl from the ore.

I claim:

1. A process for regenerating 2-layer crystalline lithium aluminate, said process comprising
   washing the said aluminate with an aqueous wash which contains at least about 800 ppm Li+ values, whereby a substantial amount, but not all, of the Li+ values are washed out without substantial destruction of the 2-layer crystal.

2. The process of claim 1 wherein the temperature of the aqueous wash is at least about 70° C.

3. The process of claim 1 wherein the temperature of the aqueous wash is in the range of about 70° C. to about 100° C.

4. The process of claim 1 wherein the concentration of Li+ values in the aqueous wash is in the range of about 800 ppm to about 1200 ppm.

5. The process of claim 1 wherein the 2-layer crystalline lithium aluminate is carried within an ion exchange resin.

6. The process of claim 1 wherein the crystalline lithium aluminate is 2-layer LiCl.2Al(OH)$_3$.nH$_2$O and the Li+ values in the aqueous wash comprise LiCl.

7. A process for extracting Li+ values from a brine source, said process comprising
   (a) providing in a vessel a composite of 2-layer crystalline LiCl.2Al(OH)$_3$.nH$_2$O in an ion exchange resin,
   (b) substantially, but not completely, unloading Li+ values from said composite by using a regenerating amount of aqueous wash containing at least about 800 ppm Li+ ion concentration, and
   (c) flowing the said Li-containing brine through the unloaded composite from step (b) until the composite is substantially loaded with Li+ values.

8. The process of claim 7 wherein steps (b) and (c) are repeated, in sequence, a plurality of times.

9. The process of claim 7 wherein the Li-containing brine is Smackover brine.

10. The process of claim 7 wherein the Li-containing brine comprises a brine leachant of Spodumene ore.

* * * * *

UNITED STATES PATENT AND TRADEMARK OFFICE
CERTIFICATE OF CORRECTION

PATENT NO. : 4,472,362
DATED : September 18, 1984
INVENTOR(S) : John Leslie Burba, III It is certified that error appears in the above—identified patent and that said Letters Patent is hereby corrected as shown below:

Col. 3, Line 63, "$LiOH \cdot b2Al(OH)_3 \cdot mH_2O$" should read --$LiOH \cdot 2Al(OH)_3 \cdot mH_2O$--

Signed and Sealed this

Ninth Day of April 1985

[SEAL]

Attest:

DONALD J. QUIGG

Attesting Officer     Acting Commissioner of Patents and Trademarks